United States Patent
McCrory et al.

(10) Patent No.: US 6,640,289 B2
(45) Date of Patent: Oct. 28, 2003

(54) SOFTWARE CONTROLLED CACHE LINE OWNERSHIP AFFINITY ENHANCEMENTS IN A MULTIPROCESSOR ENVIRONMENT

(75) Inventors: Duane J. McCrory, Malvern, PA (US); Anthony P. Gold, Exton, PA (US); Andrew Sanderson, Havertown, PA (US)

(73) Assignee: Unisys Corporation, Blue Bell, PA (US)

( * ) Notice: Subject to any disclaimer, the term of this patent is extended or adjusted under 35 U.S.C. 154(b) by 179 days.

(21) Appl. No.: 09/761,017

(22) Filed: Jan. 16, 2001

(65) Prior Publication Data

US 2002/0095554 A1 Jul. 18, 2002

Related U.S. Application Data

(60) Provisional application No. 60/249,075, filed on Nov. 15, 2000.

(51) Int. Cl.⁷ .............................................. G06F 13/00
(52) U.S. Cl. ..................... 711/144; 711/141; 711/145; 711/120; 711/154; 710/102
(58) Field of Search ............................... 711/144, 145, 711/152, 154, 163, 3, 146, 119, 120, 124, 121, 141, 158; 709/200, 213, 216, 102

(56) References Cited

U.S. PATENT DOCUMENTS

| | | | | | |
|---|---|---|---|---|---|
| 4,394,731 A | * | 7/1983 | Flusche et al. | ............. | 711/145 |
| 4,445,174 A | * | 4/1984 | Fletcher | ...................... | 711/121 |
| 4,928,225 A | * | 5/1990 | McCarthy et al. | .......... | 711/145 |
| 5,029,070 A | * | 7/1991 | McCarthy et al. | .......... | 711/143 |
| 5,261,053 A | * | 11/1993 | Valencia | ..................... | 711/120 |
| 5,317,738 A | * | 5/1994 | Cochcroft et al. | .......... | 709/103 |
| 5,349,656 A | * | 9/1994 | Kaneko et al. | ............. | 709/102 |
| 5,355,467 A | * | 10/1994 | MacWilliams et al. | ..... | 711/146 |
| 5,551,002 A | * | 8/1996 | Rosich et al. | ................ | 711/134 |
| 5,579,473 A | * | 11/1996 | Schlapp et al. | ............. | 345/557 |
| 5,632,038 A | * | 5/1997 | Fuller | .......................... | 711/144 |
| 5,784,614 A | * | 7/1998 | Davis | ......................... | 709/102 |
| 5,787,490 A | * | 7/1998 | Ozawa | ........................ | 709/103 |
| 5,872,972 A | * | 2/1999 | Boland et al. | .............. | 709/102 |
| 5,974,438 A | * | 10/1999 | Neufeld | ....................... | 709/104 |
| 6,014,667 A | * | 1/2000 | Jenkins et al. | ................. | 707/10 |
| 6,014,690 A | * | 1/2000 | VanDoren et al. | .......... | 709/215 |
| 6,038,651 A | * | 3/2000 | VanHuben et al. | ........... | 712/17 |
| 6,052,760 A | | 4/2000 | Bauman et al. | ............. | 711/119 |
| 6,269,390 B1 | * | 7/2001 | Boland | ........................ | 709/100 |
| 6,434,697 B1 | * | 8/2002 | Leyda et al. | .................... | 713/2 |
| 2002/0004966 A1 | * | 1/2002 | Wakat et al. | ............. | 15/257.06 |
| 2002/0083149 A1 | * | 6/2002 | Van Huben et al. | ........ | 709/215 |

* cited by examiner

Primary Examiner—Hong Kim
(74) Attorney, Agent, or Firm—Michael B. Atlass; Mark T. Starr; Woodcock Washburn LLP

(57) ABSTRACT

An enhanced cache line directory entry includes at least one affinity bit that indicates an affinity for a particular type of cache line ownership. The affinity bit is used to modify a request for a cache line in accordance with the indicated affinity. The affinity bit may represent an affinity for read-only requests, and the affinity bit may represent an affinity for read-write requests. For example, if an I/O affinity bit is in the set state and an I/O device requests a cache line with read-write permission, the request may be converted to a read-only request in accordance with the indicated affinity. As another example, if a processor affinity bit is in the set state and a processor requests a cache line with read-only permission, the request may be converted to a read-write request. Software control of the affinity bits enables system performance to be tuned and cache coherency operations can thereby be reduced.

28 Claims, 5 Drawing Sheets

SOFTWARE CONTROLLED CACHE LINE OWNERSHIP AFFINITY ENHANCEMENTS IN A MULTIPROCESSOR ENVIRONMENT

This application claims the benefit of provisional application No. 60/249,075 filed Nov. 15, 2000

FIELD OF THE INVENTION

The present invention generally relates to the field of multi-processor environments. More particularly, the present invention relates to the use of an improved cache line directory entry to increase overall performance in a multi-processor environment.

BACKGROUND OF THE INVENTION

In a multi-processor environment, processors and other devices, for example, I/O devices, are interconnected via a bus and each device may include a cache memory. Each device that contains a cache memory is referred to as a caching agent or a node. Cache memory is typically faster than main memory, therefore, caches are often used to improve overall computer system performance.

In a multi-processor environment, several processors or I/O devices may each contain a "copy" of a particular cache line of data. Because several caching agents may each contain a copy of a particular cache line of data simultaneously, a system is required to control revisions to the data. In a multi-processor environment, typically only one "copy" can be a read-write copy at any one time, all other copies being read-only copies. Typically, if one caching agent requests a read-write copy of data, all other caching agents give up their copies of the cache line. In this manner, revisions to the cache lines are controlled. This system of controlling revisions to cache lines is called cache coherency and requires communication over the processor bus. Therefore, maintaining cache coherency creates processor bus traffic, which may slow down the system.

Caching agents may request a read-only copy of a cache line or a read-write copy of a cache line. Some caching agents rarely write to the cache line, yet still request the cache line with read-write permission. When a caching agent requests a cache line with read-write permission, but does not write data to the cache line, many useless cache coherency operations may occur over the processor bus. For example, if an I/O device, such as a small computer system interface (SCSI) bus, or an Ethernet network interface card (NIC), requests a read-write copy of a cache line of data, the I/O device will receive the cache line with read-write permission and all other devices with a copy of that cache line will be forced to release their copy of the cache line. However, such an I/O device rarely writes to a cache line, rather, it typically sends the data to another device for viewing purposes. This creates useless cache coherency operations when caching agents are forced to release their copy of the cache line.

Cache based computer systems lack explicit software controlled mechanisms that would enable software to modify cache line requests in order to improve overall system performance. Therefore, such a mechanism would be very desirable.

SUMMARY OF THE PRESENT INVENTION

The present invention adds additional bits, referred to herein as affinity bits, to a cache line directory entry for more efficient use of the bus that interconnects processors, I/O devices, and memory devices in a multi-processor environment. Specifically, the improved cache line directory entry includes at least one additional processor affinity bit and/or at least one I/O affinity bit. The processor affinity and I/O affinity bits are used to intelligently modify requests for cache lines in accordance with a predefined "affinity" for certain types of requests, creating more efficient bus usage by minimizing cache coherency operations.

In accordance with an aspect of the present invention, if an I/O affinity bit is in a "read-only" affinity state, and an I/O device requests a read-write copy of a cache line of data, the read-write request will be converted to a read-only request. In this case, there is an affinity toward the read-only request. Since the I/O device receives a read-only copy of the cache line, no further bus actions are required to maintain cache coherency.

In accordance with another aspect of the present invention, if a processor affinity bit is in a "read-write" affinity state, and a processor requests a read-only copy of a cache line of data, the read-only request will be converted to a read-write request. In this case there is an affinity toward the read-write request. Since the processor is likely to modify the cache line and the processor receives a read-write copy of the cache line, this minimizes the actions required for cache coherency.

Alternatively, if a particular processor typically performs only read instructions, rather than write instructions, a processor affinity bit may be set to the read-only affinity state, triggering a conversion from a read-write request to a read-only request.

Further, according to the present invention, a multi-processor system may be "tuned" by setting the affinity bits to achieve improved bus performance by minimizing cache coherency operations. Also, one or more affinity bits may be provided. For example, one affinity bit may be provided for each processor in the multi-processor system. Software may be provided to modify the affinity bits and/or to modify a cache line directory entry to facilitate system recovery from a failed caching agent.

Other features and advantages of the present invention will become evident hereinafter.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout the several views of the drawings, and wherein.

DETAILED DESCRIPTION OF THE PREFERRED EMBODIMENTS

The present invention is directed to improving multi-processor system performance by minimizing cache coherency operations through the use of cache line affinity bits to intelligently modify requests for cache lines.

Multi-processor Environment

Figure 1:
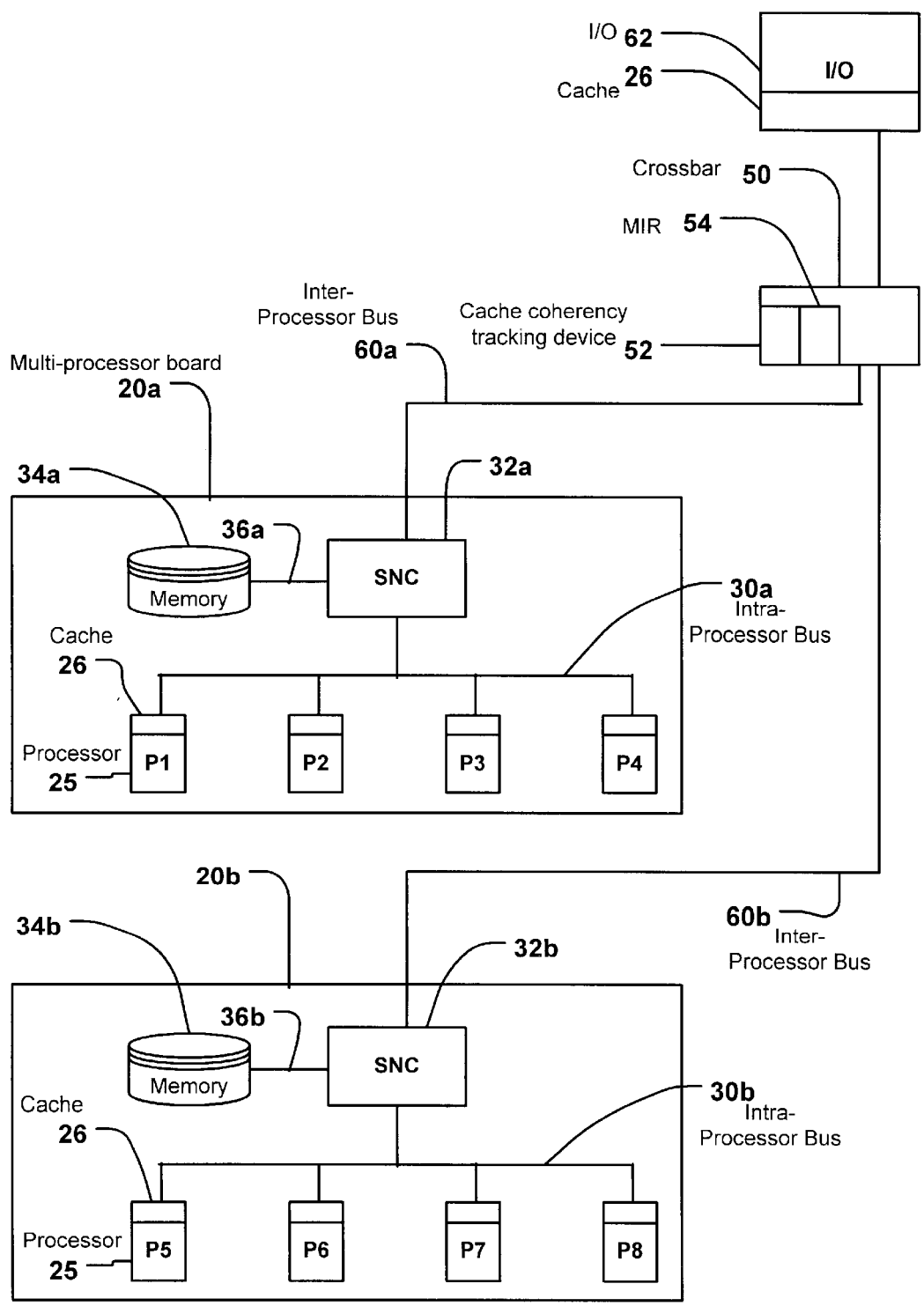
FIG. 1 is a block diagram of an exemplary multi-processor environment.

Referring now to the drawings wherein like numerals indicate like elements throughout, there is shown in FIG. 1 a block diagram of an exemplary multi-processing (MP) computer system 10 in connection with which the present invention may be employed.

It is understood, however, that the present invention is by no means limited to use in the illustrated MP computer system 10, but may be employed in any MP computer system that employs a data structure that indicates the status of the cache lines in a cache.

As shown in FIG. 1, the MP computer system 10 includes a plurality of processors 25, at least one local memory 34, and at least one crossbar 50.

The MP computer system 10 may include multi-processor boards, shown as MP boards 20a and 20b, commonly referred to herein as 20. As shown in FIG. 1, MP board 20a includes processors P1 through P4, local memory 34a, and a scalable node controller (SNC) 32a. MP board 20b includes processors P5 through P8, a local memory 34b, and a SNC 32b. Memory 34a and 34b are commonly referred to as local memory 34 herein. SNC 32a and 23b are commonly referred to as SNC 32 herein. Memory bus 36a interconnects memory 34a and SNC 32a. Memory bus 36b interconnects memory 34b and SNC 32b.

The SNC 32 includes a bus interface to the processors, an internal memory, and a scalable interface controller (not shown). The SNC 32 coordinates processor requests for data from the local memory 34. Preferably, the MP boards are constructed in a way that each processor has fair and equal access to the same set of resources (e.g., local memory 34). Main memory comprises the local memories 34 on the MP boards 20. In this manner, the main memory is physically distributed across the MP boards 20. Main memory may store computer readable data and/or computer executable instructions.

In the MP board 20a, the processors P1 through P4 are interconnected by an intra-processor bus 30a. Intra-processor bus 30a is a high speed data connection that allows processors on the same MP board (e.g., processor P1 and processor P4 on MP board 20a) to communicate among each other and with the SNC 32a. MP board 20b includes an intra-processor bus 30b. Intra-processor bus 30a and 30b are commonly referred to as intra-processor bus 30 herein. The intra-processor-bus 30 is used to transport computer readable data and/or computer executable instructions among processors and memory.

In one embodiment, each processor 25 includes a cache 26, as shown in FIG. 1. A cache 26 typically is one or more data random access memories (RAM)s and associated control logic, internal (and sometimes external) to a processor 25 or other caching device (e.g., I/O device 62), for holding "lines" of data typically comprising a predefined number of words. These RAMs, and the associated control logic, are called caches. Processors 25 utilize caches 26 to improve performance, since the data is "closer" to the processor and operates at higher access speeds than local memory 34. For example, if processor P1 needs a particular data, and that particular data is in the cache of processor P1, the processor P1 does not have to make a request over the intra-processor bus 30a, rather it will use the data in the cache of processor P1. This not only reduces the time to get the data, but reduces communication traffic on the inter-processor bus 30. A device with a cache is referred to herein as a caching agent or a node.

The I/O device 62 is connected to a crossbar 50 to provide communication between the I/O device 62 and the processors 25. The I/O device 62 may be a small computer system interface (SCSI) bus, or an Ethernet network interface card (NIC), for example. The I/O device 62 may include a cache 26, and therefore, be a caching agent or a node.

The MP boards 20 are also connected via respective buses 60a and 60b, to the crossbar 50. The buses 60a and 60b are used to transport computer readable data and/or computer executable instructions among processors on different MP boards (e.g., between processor P1 on MP board 20a and processor P8 on MP board 20b), and between the processors and the I/O devices (e.g., between processor P1 on MP board 20a and I/O device 62).

The crossbar 50 provides the electrical connectivity between the different nodes that comprise the computer system (e.g., the processors and the memory). It also provides the switching function to route requests or responses to previous requests from one node to another based on the address supplied with each request.

The crossbar 50 includes a cache coherency tracking device 52. The cache coherency tracking device is a data structure that contains information about the status of cache lines that may be located within the caching agents. Specifically, in this example, the cache coherency tracking device comprises a cache line directory having an entry for each cache line that it tracks. The cache coherency tracking device tracks which cache lines of memory are stored in which caching agent(s) and what ownership rights each agent has (e.g., a read-write copy of the cache line). In one embodiment, the cache coherency tracking device is a snoop filter. In another embodiment, the cache coherency tracking device is a directory memory. Other forms of cache coherency tracking devices may also be employed.

Typically the crossbar has a limited number of connection points, for example eight. However, multiple crossbars can be cascaded to handle more than the limit of connection points for one crossbar. The crossbar may include a memory interleave register (MIR) that defines how addresses within a given address range are spread across the local memories of the MP boards.

Cache Lines

In order to make memory data transfers more efficient, most MP computer systems organize memory into multiple byte units. Typically, a cache line within a processor cache is equal in size to the size of the multiple byte unit. The caches can be thought of as holding cells for data that would normally reside in main memory.

A caching agent may have a read-write copy of a cache line. This form of ownership is often referred to as "exclusive" ownership. If a caching agent has a read-write copy, the caching agent has permission to read and write to the cache line. In this case, the caching agent is considered to have exclusive ownership of the cache line, and is also referred to as the owning node of that cache line. A caching agent may also have a read-only copy of a cache line. If a caching agent has a read-only copy, the caching agent has permission to read the cache line, but not to write to the cache line. This is often referred to as "shared" ownership (i.e., if one or more caching agents have a read only copy of a cache, the caching agent(s) are said to share the cache line.) If the data for a particular memory address resides in a particular local memory (e.g., local memory 34a on MP board 20a), that local memory is considered the home node of that particular data.

In an MP computer system, the memory addresses associated with each cache line are unique, and thus the common portion of the memory address range shared by each byte in the same cache line is referred to as the cache line tag. The cache line tag maps the cache to a location in main memory. Normally, the cache line size (in bytes) is a power of 2 (e.g. 16, 32, 64, 128, etc). Typically, a cache line is a set size of bytes for a particular MP computer system. For example, Intel Corporation's Pentium® Processor family utilizes 32 byte cache lines. Thus some lower bits within the memory address are used to distinguish a specific byte or beginning range of bytes within the cache line. These lower address bits are not considered part of the tag, since they are not common between all the bytes in the memory address range associated with the cache line.

Cache Line Coherency

In order to logically share resources and produce the desired side effects, coordination mechanisms are added to the MP computer system. For input/output operations this coordination is typically done in software using an operating system and device drivers. For memory operations this coordination is typically done in hardware through a mechanism called cache coherency.

In an MP computer system, there are multiple processors and thus there usually are multiple caches. The rules for defining how caches are maintained coherent with each other and main memory, and consistent with the software intention (as defined by the instruction code sequence) are referred to as cache coherency.

The typical rules for maintaining coherency of cache lines are as follows:

Only one caching agent is allowed to modify the contents of a cache line at a time.

If a caching agent has been given the right to modify the cache line (i.e., a read-write copy of the cache line) then no other copy of the cache line shall exist in any other cache.

Multiple copies of a cache line may exist in multiple caching agents as long as they are all read-only copies.

Thus, for example, if a caching agent has a read-only copy of a cache line and the software instructions that it is currently executing indicates that it should modify one or more bytes in memory "covered" by that cache line, then the caching agent must request a read-write copy of the cache line before it is allowed to modify the data. A mechanism is used to handle the race condition where different caching agents make simultaneous requests to modify the same cache line. One caching agent will win the race and be given a read-write copy of the cache line; all other caching agents will be told to invalidate their copy of the cache line. Subsequently a second caching agent will eventually be given a read-write copy of the cache line but with the new data as modified by the caching agent that originally won the race.

Systems may be designed with additional rules and exception cases for instance:

A caching agent (e.g., processor 25 or I/O device 62) may, under some circumstances, know that it will modify an entire cache line (e.g., an I/O device 62 reading data from a disk and writing it into local memory 34). Under these circumstances it may issue a write of the entire cache line without having explicitly requested a read-write copy.

A caching agent may, under some circumstances, request a current copy of a cache line without explicitly causing the current owner to give up ownership.

Along with the rules for sharing of a single cache line, the system often has additional ordering rules regarding how modifications to multiple cache lines become visible to other caching agents in the system. For instance, the Intel® IA-32 system architecture requires very strong ordering. If an Intel Pentium® Processor modifies cache line A then modifies cache line B, the processor should not observe that cache line B has been updated without having already observed that cache line A has been invalidated/modified. In other terms, the caching agent should not still see old data values in cache line A after it has already seen new data values in cache line B.

Cache Coherency Management

A system can be designed with one or more different cache coherency tracking devices for tracking cache line ownership. Two common cache coherency tracking devices include a directory memory and a snoop filter. Each device includes a cache line directory entry described below.

A directory memory is a RAM structure that tracks cache line ownership for every possible cache line in memory. A snoop filter is nearly identical to a directory memory in how it tracks cache line ownership, but a snoop filter doesn't track every possible cache line in memory. Instead a snoop filter tracks a subset of cache lines that appear to be in use, and it forces caching agents to release cache lines that it decides to no longer track. This behavior is called a back invalidate. In a snoop filter design, when a caching agent makes a cache line reference and that line isn't currently being tracked in the snoop filter then the snoop filter knows that the most recent version of the data is in memory. A directory memory never has to issue back invalidates because it tracks every possible cache line.

Figure 2:
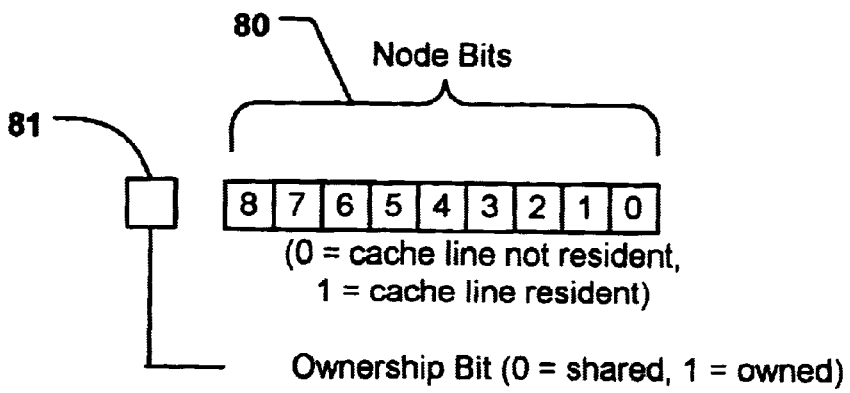
FIG. 2 is a block diagram of a prior art cache line directory entry structure.

FIG. 2 shows a prior art cache line directory entry for tracking a cache line. As shown in FIG. 2, the prior art cache line directory entry includes a "node" section 80 including a bit for each possible caching agent, or node, in the MP computer system, and an ownership bit 81 indicating whether the cache line is shared (i.e., "shared" ownership) or owned (i.e., "exclusive" ownership). The bits of node section 80 correspond to each caching agent in the MP computer system (e.g., bit 0 may corresponds to processor P1, etc.). If a bit is set to a logical "1", then a copy of that cache line is resident in the caching agent associated with that bit. If a bit is set to a logical "0", then no copy of that cache line exists in the caching agent associated with that bit. Alternatively, these designations may be reversed. If the cache line is owned, then only a single bit in the node section 80 is set to the indicate that a copy of a cache line is resident in a caching agent. In this case the caching agent is the owning node (i.e., the node that owns the cache line and has the read-write copy) and the ownership bit 81 is in the owned state. If the cache line is shared then one or more bits in node section 80 are set indicating where copies of the cache line possibly exist and the ownership bit 81 is not set. The special case where no bits in node section 80 are set indicates that the line is not currently shared or owned and that the most recent data is in memory (i.e. not in any cache).

System and Method for Enhanced Cache Line Directory Entry

Figure 3:
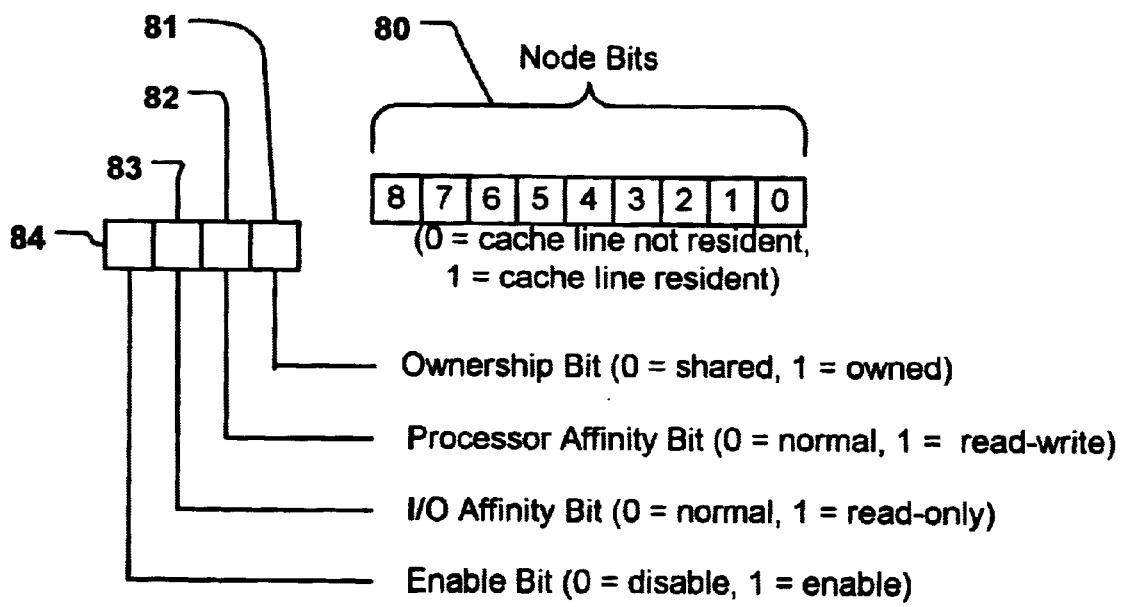
FIG. 3 is a block diagram of an exemplary cache line directory entry structure in accordance with the present invention.

FIG. 3 shows an embodiment of a cache line directory entry in accordance with the present invention. As shown in FIG. 3, the cache line directory entry includes a node section 80, an ownership bit 81, at least one processor affinity bit 82, and/or at least one I/O affinity bit 83. In one embodiment, the processor affinity bit 82 and the I/O affinity bits 83 default to the zero state. As described hereinafter, the affinity bits 82, 83 can be programmed by software to tune cache line performance. Optionally, the cache line directory entry comprises at least one enable bit 84.

As used herein and in the claims, the term "affinity bit" means a bit that when set indicates a preference or affinity for one type of request or data ownership over another. A system may act in response to an affinity bit by modifying its behavior in accordance with the indicated affinity, as described and illustrated more fully below in accordance with exemplary embodiments of the present invention.

The "node" section 80 includes a bit for each possible caching agent, or node, in the MP computer system. An ownership bit 81 indicates whether the cache line is shared or owned. The bits of node section 80 correspond to each caching agent in the MP computer system (e.g., bit 0 corresponds to processor P1, etc.). If a bit is set to a logical "1", then a copy of that cache line is resident in the caching agent associated with that bit. If a bit is set to a logical "0", then no copy of that cache line exists in the caching agent associated with that bit. Alternatively, a logical "0" may indicate that a cache line is resident and a logical "1" may indicate that no cache lines are resident.

The ownership bit 81 indicates whether the cache line is owned or shared. If the ownership bit is set to a logical "0", the shared state, then the cache line is shared and no read-write copy of the cache line exists in any caching agent. If the ownership bit is set to a logical "1", the owned state, then the cache line is owned by a caching agent with a read-write copy of the cache line, also referred to as the exclusive state. Alternatively, logical "1" may be the owned state and logical "0" may be the shared state.

According to the present invention, the processor affinity bit 82 modifies the cache behavior of the system such that when a processor requests a particular form of ownership of a cache line (i.e., shared or exclusive), the cache line ownership request may be changed based on a predefined "affinity" for a different type of ownership. For example, there may be an "affinity" for read-write ownership and any request by a processor for read-only ownership may, on the basis of the processor affinity bit, be converted to a request for read-write ownership. This will enable the processor to subsequently modify the cache line without going through any additional bus transactions, assuming that the processor doesn't lose the read-write permission in the mean time. In one embodiment, a logical "0", the normal state, will not trigger any changes to requests for cache lines and a logical "1", representing the predefined affinity, may trigger modifications to requests for cache lines. Alternatively, these designations may be reversed.

According to the present invention, the I/O affinity bit 83 modifies the cache behavior of the system such that when the I/O device requests a particular form of ownership of a cache line (i.e., shared or exclusive), the cache line ownership may be changed based on a predefined "affinity" for a different type of ownership. For example, there may be an "affinity" for read-only ownership and any request by an I/O device for read-write ownership may, on the basis of the I/O affinity bit, be converted to a request for read-only ownership. In one embodiment, a logical "0", the normal state, will not trigger any changes to requests for cache lines and a logical "1", representing the predefined affinity, may trigger modifications to requests for cache lines. Alternatively, these designations may be reversed. This provides a potential optimization for output buffers (e.g., Transmission Control Protocol/Internet Protocol (TCP/IP) packets) since the cache line in a processor cache can remain a read-write copy in the processor cache while the I/O device (e.g., Network Interface Card (NIC) is transferring the packet.

If the I/O device is a caching agent, then there is a cache coherency issue that must be resolved by the operating system. The cache line will be resident as a read-only copy in the I/O device while also possibly being resident as a read-write copy in a processor cache. In this case a special sequence is defined that the operating system can issue to inform the I/O device that it needs to purge cache lines from a specific memory range.

Preferably, the system allows the state of the affinity bits to be set/reset as desired for optimal performance. One mechanism for allowing software to control the contents of the cache line directory is to make the cache coherency tracking device entries appear as part of the physical address space of the system (e.g., by utilizing a range of high order physical addresses). Normally, this directory memory range must be read and written using un-cached memory accesses. The directory memory entries may optionally include configuration registers (not shown) that will enable/disable software's ability to directly modify the directory memory.

Allowing software to read and write the "node bits" in node section 80 also enables the operating system to do better system recovery when a processor or an I/O device fails, since it can determine which cache lines were owned by which caching agents and fix the cache line ownership to eliminate the failed caching agent. The data for read-write copies of cache lines might be inconsistent though, because the most recently written copy of the cache line may be stuck in the cache of the failed caching agent. Care must be taken by the operating system to synchronize the processors in the MP computer system when updating the node bits in a cache line directory entry.

In another embodiment, the cache line directory entry includes a processor affinity bit for each processor in the MP computer system and an I/O affinity bit for each I/O device in the MP computer system. Thus in this embodiment, each caching agent has an associated affinity bit. Therefore, each affinity bit could be selected to match that caching agent's typical uses. For example, if one processor performs normal functions, its affinity bit could be set to the normal state and if another processor performs only write functions, its affinity bit could be set to the read-write state. Of course, if reduction of external Dynamic Random Access Memory (DRAM) and internal RAM requirements of the system is important, it may be preferable to implement one processor affinity bit and one I/O affinity bit, as in the embodiment shown in FIG. 3 and discussed above.

In yet another embodiment, the cache line directory entry may comprise a processor affinity data field which allows more than two states, for example, two bits. In this case the states may comprise a normal state, a read-write "affinity" state, and a read-only "affinity" state. In this manner, a processor that typically performs only reading functions may have its read-write requests for cache lines modified to read-only requests.

In another embodiment, the cache line directory entry may comprise at least one enable bit 84. The enable bit 84 provides an indication for the system to enable or disable conversion of requests in accordance with their indicated affinity. In one embodiment, a logical "0", the enable state, will enable changes to requests for cache lines and a logical "1", representing the disable state, will disable modifications to requests for cache lines. Alternatively, these designations may be reversed.

The enable bit stores an enabling indication to be applied by the system in converting a read-write request to a read-only request in accordance with the indicated affinity, wherein if the enabling indication is set, the system converts the read-write request to a read-only request, and if the enabling indication is not set, the system does not convert the read-write request to a read-only request. The enable bit stores an enabling indication to be applied by the system in converting a read-only request to a read-write request in accordance with the indicated affinity, wherein if the enabling indication is set, the system converts the read-only request to a read-write request, and if the enabling indication is not set, the system does not convert the read-only request to a read-write request.

In an alternate embodiment, the cache line directory entry includes an enable bit for each processor and each I/O device in the MP computer system. Thus in this embodiment, each caching agent has an associated enable bit. Therefore, each enable bit could be set to enable or disable the affinity of that particular caching agent.

Figure 4:
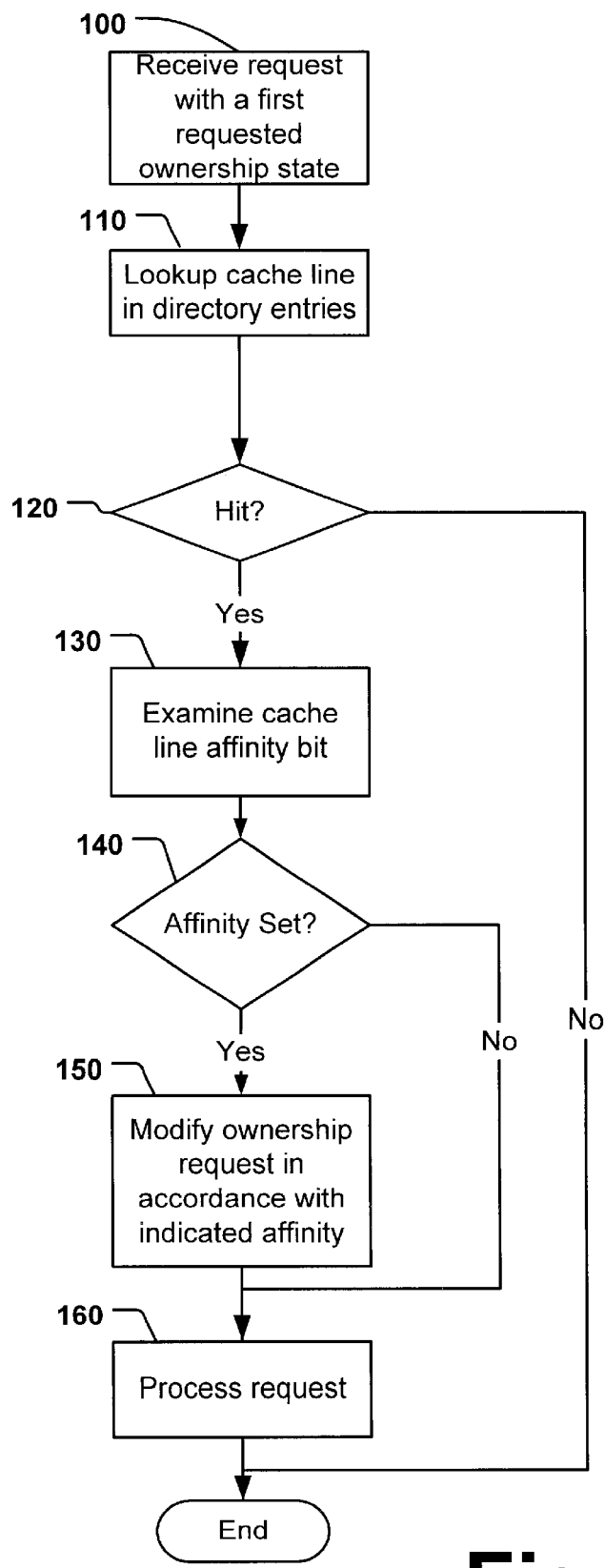
FIG. 4 is a flow chart showing details of an embodiment of the present invention.

FIG. 4 is a flow diagram illustrating a method of the present invention in accordance with one embodiment thereof. As shown, in FIG. 4, at step 100, a device (e.g., an I/O device or a processor) requests data with a first requested ownership state and the system of the present invention receives the request.

At step 110, the cache line directory entries are searched for the requested cache line. If the cache line is found in the cache line directory entries, it is considered a hit. This means that the cache line is in at least one caching agent in the MP computer system.

At step 120, the system responds based on whether or not there was a hit at step 110. If there was not a hit, the system does not modify the first requested ownership state and processes the request in a conventional manner. If there was a hit, and the cache line was found in the cache line directory entries, then the system proceeds to step 130. At step 130, the system examines the cache line affinity bit to determine the state of the affinity bit.

At step 140, the system responds based on the state of the affinity bit. If the affinity bit is in the normal state, then the system does not modify the first requested ownership state. If the affinity bit is in the set state, then the request is modified in accordance with the indicated affinity, as shown at step 150.

At step 160, the system processes the request. For example, the system forwards the request to the owning node of the cache line.

Figure 5:
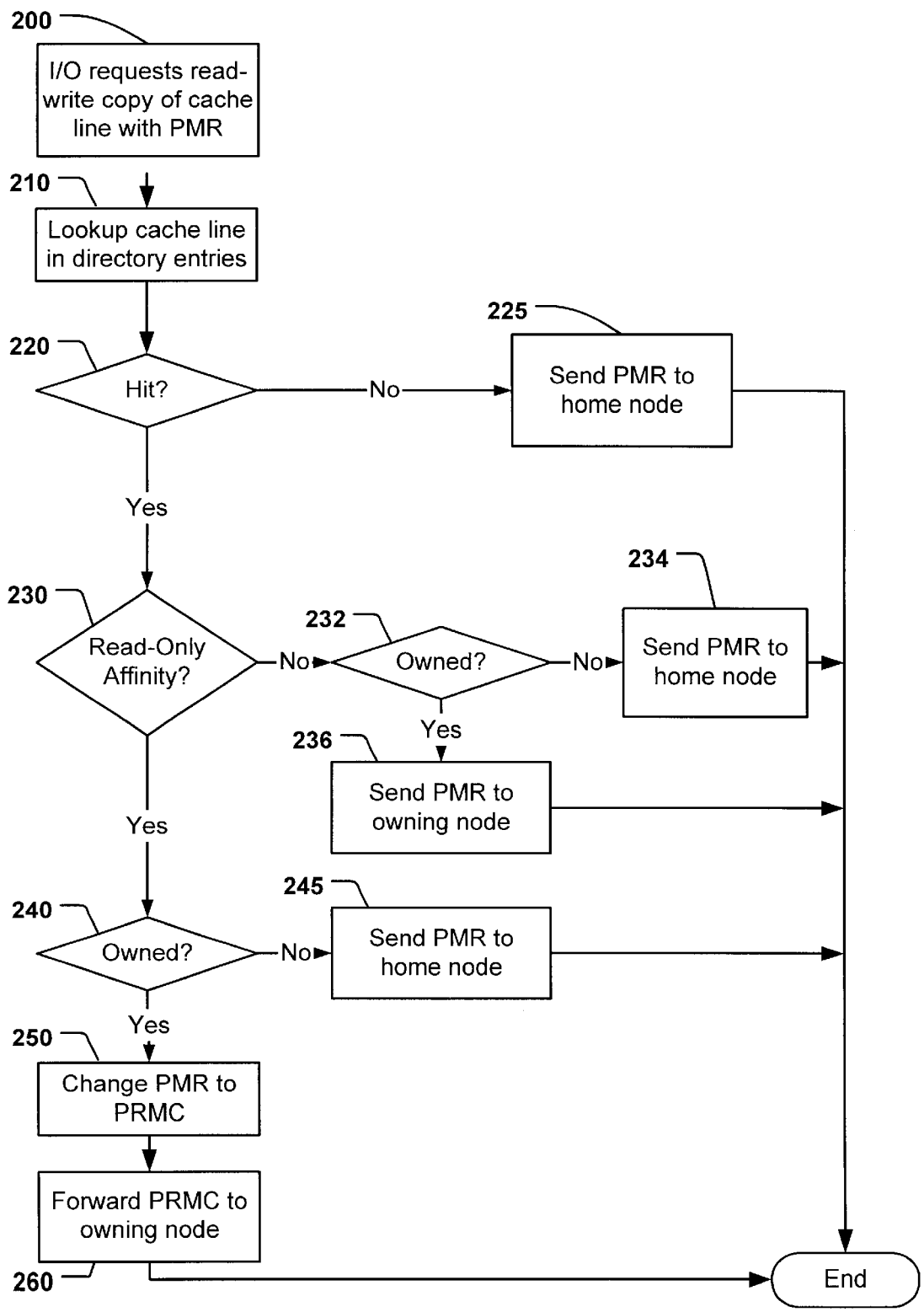
FIG. 5 is a flow chart showing further details of another embodiment of the present invention.

FIG. 5 is a flow diagram illustrating another embodiment of the present invention in which an affinity bit is used to give affinity to a particular kind of request for data from an I/O device. As shown, in FIG. 5, at step 200, an I/O device (e.g., I/O device 62 of MP computer system 10 shown in FIG. 1) requests a read-write copy of a cache line with a Port Memory Read (PMR) instruction.

At step 210, the cache line directory entries are searched for the requested cache line. If the cache line is found in the cache line directory entries, it is considered a hit. This means that the cache line is in at least one caching agent in the MP computer system.

At step 220, the system responds based on whether or not there was a hit at step 210. If there was not a hit, and the cache line was not found in the cache line directory entries, then the system sends the PMR instruction to the home node of the data, as shown in step 225. If there was a hit, and the cache line was found in the cache line directory entries, then the system proceeds to step 230.

At step 230, the system responds based on the state of the I/O affinity bit. If the I/O affinity bit is in the normal state, then the system proceeds to step 232 and determines if a caching agent with the cache line, has a read-write copy of the cache line. If a caching agent has a read-write copy of the cache line, the PMR instruction is sent to the owning node, as shown at step 236. If no processor has a read-write copy of the cache line, the PMR instruction is sent to the home node, as shown at step 234.

At step 230, if the I/O affinity bit is in the read-only state, the process proceeds to step 240 and determines if the caching agent has a read-write copy of the cache line (i.e., if the caching agent owns the cache line in the exclusive state). If the caching agent does not have a read-write copy of the cache line, the system sends the PMR instruction to the home node, as shown in step 245.

At step 240, if the caching agent does have a read-write copy of the cache line, the system converts the PMR instruction to a Port Read Memory Current (PRMC) instruction, which is a read-only request, in accordance with the indicated affinity, as shown in step 250.

At step 260, the system forwards the PRMC instruction to the owning node of the cache line.

Figure 6:
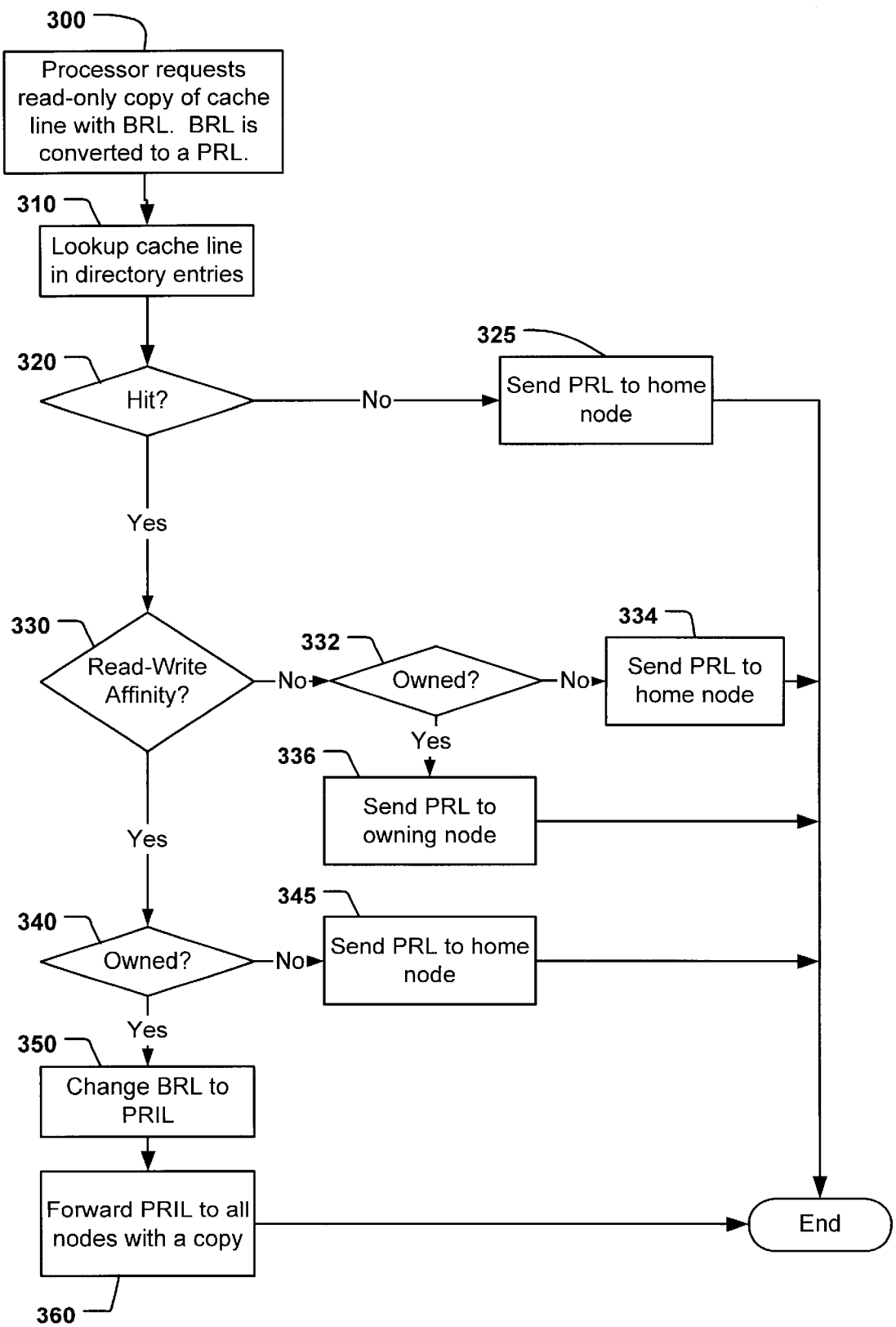
FIG. 6 is flow chart showing further details of another embodiment of the present invention.

FIG. 6 is a flow diagram illustrating another embodiment of the present invention in which an affinity bit is used to give affinity to a particular kind of request for data from a processor. As shown, in FIG. 6, at step 300, a processor (e.g., processor 25 of MP computer system 10) requests a read-only copy of a cache line with a Bus Read Line (BRL) instruction. The BRL instruction is converted to a Port Read Line (PRL) instruction by the SNC to access the intra-processor bus 60.

At step 310, the cache line directory entries are searched for the requested cache line. If the cache line is found in the cache line directory entries, it is considered a hit. This means that the cache line is in a cache in at least one caching agent in the MP computer system.

At step 320, the system responds based on whether or not there was a hit at step 310. If there was not a hit, and the cache line was not found in the cache line directory entries, the system sends the PRL instruction, a read-only request, to the home node of the data, as shown at step 325. If there was a hit, and the cache line was found in the cache line directory entries, then the system proceeds to step 330.

At step 330, the system responds based on the state of the processor affinity bit. If the processor affinity bit is in the normal state, then the system proceeds to step 332 and determines if a caching agent with the cache line, has a read-write copy of the cache line (i.e., if the caching agent owns the cache line in the exclusive state). If a caching agent has a read-write copy of the cache line, the PRL instruction, a read-only request, is sent to the owning node, as shown at step 336. If no processor has a read-write copy of the cache line, then the PRL instruction, a read-only request, is sent to the home node, as shown at step 334.

At step 330, if the processor affinity bit is in the read-write state, the system proceeds to step 340 and determines if the caching agent has a read-write copy of the cache line. If the caching agent does not have a read-write copy of the cache line, the system sends the PRL instruction to the home node, as shown in step 345.

At step 340, if the caching agent does have a read-write copy of the cache line, the system converts the PRL instruction into a Port Read Invalidate Line (PRIL) instruction, a read-write request, in accordance with the indicated affinity, as shown in step 350.

At step 360, the system forwards the PRIL instruction to all nodes with a copy of the requested cache line. In this manner, all nodes with a copy of the requested cache line must release their copy of the cache line in order to give the requester the desired ownership.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to exemplary embodiments, it is understood that the words which have been used herein are words of description and illustration, rather than words of limitation. Further, although the invention has been described herein with reference to particular structure, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A data structure for storing a cache line directory entry for a given cache line of a multi-processor system, the data structure comprising:
   a plurality of first data fields, each corresponding to a respective node in the multi-processor system that may have ownership rights in the cache line;
   a second data field representing an ownership type associated with the cache line; and
   a third data field for storing an indication of an affinity for a particular type of data ownership to be applied by the system in converting a cache line request in accordance with the indicated affinity.

2. The data structure of claim 1 wherein the third data field stores an indication of an affinity for read-only requests, wherein the system will, in response to the indication, convert a read-write request to a read-only request in accordance with the indicated affinity.

3. The data structure of claim 1 wherein the third data field stores an indication of an affinity for read-write requests, wherein the system will, in response to the indication, convert a read-only request to a read-write request in accordance with the indicated affinity.

4. The data structure of claim 1 wherein the data structure comprises a plurality of third data fields, each third data field associated with a respective caching agent of the multiprocessor system and each providing an affinity indication for its respective caching agent, wherein different caching agents may have a different affinity indication.

5. The data structure of claim 1 further comprising a fourth data field for storing an enabling indication to be applied by the system to a particular type of data ownership.

6. The data structure of claim 2 further comprising a fourth data field for storing an enabling indication to be applied by the system in converting a read-write request to a read-only request in accordance with the indicated affinity, wherein if the enabling indication is set, the system converts the read-write request to a read-only request, and if the enabling indication is not set, the system does not convert the read-write request to a read-only request.

7. The data structure of claim 3 further comprising a fourth data field for storing an enabling indication to be applied by the system in converting a read-only request to a read-write request in accordance with the indicated affinity, wherein if the enabling indication is set, the system converts the read-only request to a read-write request, and if the enabling indication is not set, the system does not convert the read-only request to a read-write request.

8. A computer system comprising:
   a plurality of processors, a main memory, and at least one I/O device;
   a main memory cache that stores cache lines of data; and
   a data structure that stores a cache line directory entry for each cache line in said cache, each cache line directory entry comprising:
      a plurality of first data fields, each corresponding to a respective node in the computer system that may have ownership rights in the cache line;
      a second data field representing an ownership type associated with the cache line; and
      a third data field for storing an indication of an affinity for a particular type of data ownership to be applied by the system in converting a cache line request in accordance with the indicated affinity.

9. The computer system of claim 8 wherein the third data field stores an indication of an affinity for read-only requests, wherein the system will, in response to the indication, convert a read-write request to a read-only request in accordance with the indicated affinity.

10. The computer system of claim 8 wherein the third data field stores an indication of an affinity for read-write requests, wherein the system will, in response to the indication, convert a read-only request to a read-write request in accordance with the indicated affinity.

11. The computer system of claim 8 wherein the data structure comprises a plurality of third data fields, each third data field associated with a respective caching agent of the multiprocessor system and each providing an affinity indication for its respective caching agent, wherein different caching agents may have a different affinity indication.

12. The computer system of claim 8 further comprising a fourth data field for storing an enabling indication to be applied by the system to a particular type of data ownership.

13. The computer system of claim 9 further comprising a fourth data field for storing an enabling indication to be applied by the system in converting a read-write request to a read-only request in accordance with the indicated affinity, wherein if the enabling indication is set, the system converts the read-write request to a read-only request, and if the enabling indication is not set, the system does not convert the read-write request to a read-only request.

14. The computer system of claim 10 further comprising a fourth data field for storing an enabling indication to be applied by the system in converting a read-only request to a read-write request in accordance with the indicated affinity, wherein if the enabling indication is set, the system converts the read-only request to a read-write request, and if the enabling indication is not set, the system does not convert the read-only request to a read-write request.

15. The computer system of claim 8 further comprising a cache coherency tracking device, which comprises the cache line directory entry.

16. The computer system of claim 15 wherein the cache coherency tracking device comprises a snoop filter.

17. The computer system of claim 15 wherein the cache coherency tracking device comprises a directory memory.

18. The computer system of claim 8 further comprising a multi-processor board.

19. The computer system of claim 8 wherein the multi-processor board comprises the processor.

20. The computer system of claim 8 further comprising a plurality of multi-processor boards.

21. The computer system of claim 20 further comprising a crossbar connected to each of the plurality of multi-processor boards.

22. The computer system of claim 21 wherein the crossbar comprises the data structure.

23. A method for requesting a cache line in a multi-processor computer system, said method comprising:

receiving a request for a particular type of ownership of a selected cache line;

determining the state of a data field in a cache line directory entry wherein the data field indicates an affinity for a particular type of ownership associated with said cache line; and if the requested type of ownership is different than the type indicated by the data field, modifying the request in accordance with the indicated affinity.

24. The method of claim 23 wherein modifying the request in accordance with the indicated affinity comprises modifying a read-write request to a read-only request in accordance with the indicated affinity.

25. The method of claim 23 wherein modifying the request in accordance with the indicated affinity comprises modifying a read-only request to a read-write request in accordance with the indicated affinity.

26. The method of claim 24 wherein modifying a read-write request to a read-only request in accordance with the indicated affinity comprises modifying a port read memory instruction to a port read memory current instruction.

27. The method of claim 25 wherein modifying a read-only request to a read-write request in accordance with the indicated affinity comprises modifying a port read line instruction to a port read invalidate line instruction.

28. The method of claim 23 further comprising determining the state of a second data field, for storing an enabling indication, and enabling said modifying the request if said enabling indication is set and disabling said modifying the request if said enabling indication is not set.

* * * * *